Nov. 17, 1959 B. AUGIER DE CREMIERS 2,912,865
GYROSCOPIC APPARATUS
Filed Aug. 7, 1957 3 Sheets-Sheet 1

INVENTOR
BERNARD AUGIER de CREMIERS

ATTORNEYS

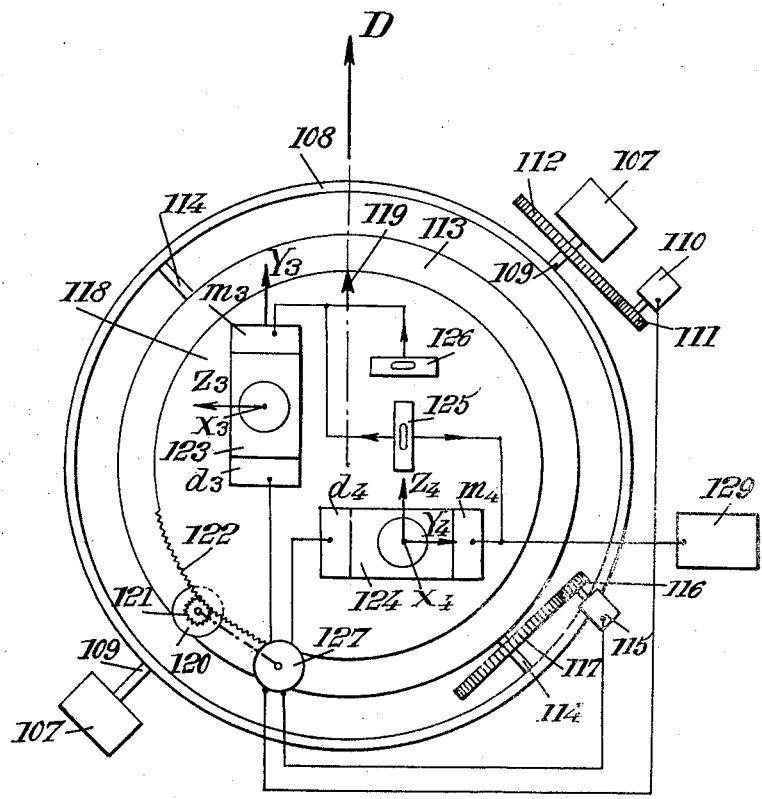

United States Patent Office 2,912,865
Patented Nov. 17, 1959

2,912,865

GYROSCOPIC APPARATUS

Bernard Augier de Cremiers, Neuilly-sur-Seine, France, assignor to Societe d'Applications Generales d'Electricite et de Mecanique, S.A.G.E.M., Paris, France, a French society Application August 7, 1957, Serial No. 676,772

Claims priority, application France August 10, 1956

5 Claims. (Cl. 74—5.34)

The present invention relates to gyroscopic apparatus, that is to say to apparatus including gyroscopes and serving for instance to indicate a direction, called "reference direction," or to keep a member in fixed position with respect to said direction. This definition applies in particular to gyrocompasses and to devices for stabilizing a table which is to be kept horizontal.

The object of the present invention is to provide an apparatus of this kind which is better adapted to meet the requirements of practice than those used up to this time, and in particular which is simpler, occupies a smaller volume and is easier of maintenance.

The apparatus according to this invention includes, mounted on a controlled member or table, at least two single-degree-of-freedom gyroscopes having their respective input axes transverse, and preferably at right angles, to each other, said table being movable with two degrees of freedom with respect to the reference direction which is at right angles to a plane parallel to both of said input axes in the position of rest of the apparatus, said gyroscopes being capable, in response to deflections of their output axes, of rotating said table about two different respective axes both making an angle with said reference direction, at least two detectors being mounted on said platform to detect deviations thereof from said reference direction about respective axes parallel to the input axes of said gyroscopes.

According to the present invention, each of said detectors is arranged to generate a torque tending to deflect, about its output axis, the gyroscope the input axis of which is not parallel to the axis about which said last mentioned detector is detecting deviations of the table.

Preferred embodiments of the present invention will be hereinafter described with reference to the accompanying drawings, given merely by way of example and in which:

Fig. 1 diagrammatically shows, in perspective view, the essential elements of a single-degree-of-freedom gyroscope such as used in a gyroscopic apparatus according to the invention.

Fig. 5 is a diagrammatic plan view of a gyroscopic apparatus according to the invention, for stabilizing a table which is to be kept horizontal.

The invention will first be described in its application to the construction of a gyro-compass.

The apparatus according to the invention making use of gyroscopes of the so-called "single-degree-of-freedom" type, some explanations will first be given concerning these gyroscopes.

Figure 1:
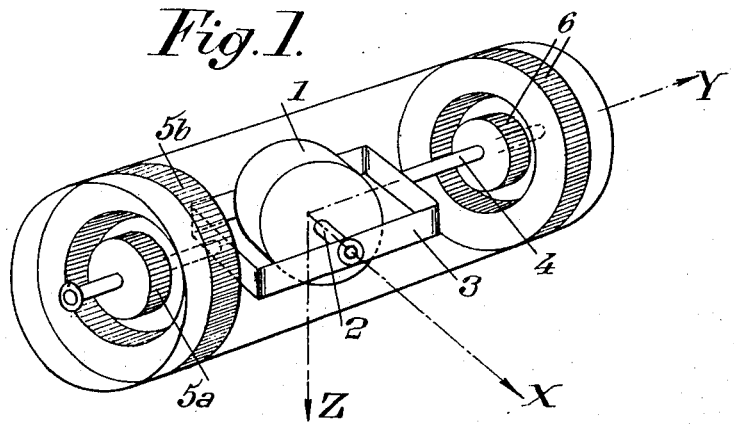

Fig. 1 shows the essential elements of a single-degree-of-freedom gyroscope. It includes a gyroscope rotor 1 driven by a motor, generally an electric motor, running at constant speed, said rotor 1 being journalled through a spindle 2 in a gimbal 3 of any suitable shape, itself journalled in the frame of the apparatus through a spindle 4 at right angles to the spindle 2 of rotor 1.

The different axes of the gyroscope are called as follows:

the axis X of rotor 1 is called the "spin axis,"
the axis Y of the gimbal 3 is called the "output axis,"
and an axis Z, perpendicular to both of the axes X and Y when the gyroscope is working without deflection, is called the "input axis."

Such a single-degree-of-freedom gyroscope is only capable of transmitting a signal corresponding to the angle of rotation of gimbal 3 from its initial position about axis Y, which angle of rotation is detected by means of a detector one element 5a of which is rigid with gimbal 3 and the other element 5b of which is carried by the frame.

Such a detector may be constituted by a potentiometer delivering a voltage proportional to the angle through which gimbal 3 has turned with respect to its initial position.

The rotation of gimbal 3 about axis Y may be controlled at least partly by means of a torque motor 6 mounted about said axis Y and the respective elements of which (that is to say the rotor and the stator) are respectively carried by gimbal 3 and by the frame of the gyroscope. When such a torque motor is excited from the outside, it exerts upon gimbal 3 a torque about the output axis Y with respect to which the whole of rotor 1 and frame 3 has a rotational inertia.

Finally, the rotation movements of said rotating unit (rotor 1 and gimbal 3) are braked by a damping device 200, for instance a hydraulic one, the braking torque of which is proportional to the speed of rotation.

The operation of such a single-degree-of-freedom gyroscope is explained as follows, rotor 1 being supposed to be driven at constant speed:

Gimbal 3 is subjected to the action of two torques applied respectively by the gyroscopic effect of a rotation of the apparatus about the input axis and by torque motor 6. But the movement of gimbal 3 about the output axis Y immediately creates two opposing torques, one due to the inertia of the rotating system and the other to the action of the damping device.

In accordance with the principle that action and reaction are equal to each other, the sum of these two last mentioned torques is exactly opposed to that of the two first mentioned ones. In particular, in the absence of transient conditions which would imply the existence of inertia torques, only the friction torque, proportional to speed, is opposed to the torques created by the gyroscopic effect and by torque motor 6. It follows that the angular position of gimbal 3, which is the integral of its speed, is also the integral of the torques applied by the gyroscopic effect and by torque motor 6. This is why such a gyroscope is sometimes called an integrating gyroscope.

The action of torque motor 6 is easy to understand, but that of the gyroscopic effect is less obvious and, for the sake of clarity, explanations will be given concerning the application of the invention to an apparatus for detecting the North direction.

With respect to the gyroscopic effect, only the imposed rotations are to be considered and it is always possible to decompose any rotation into three component rotations each about one of the three above mentioned axes X, Y and Z, which are at right angles to one another.

A rotation about the spin axis X has for its effect to increase or to reduce the speed of rotation of rotor 1 with respect to gimbal 3. In view of the fact that said rotor is driven by its motor at a very high speed, it is possible to neglect the small relative variations due to a rotation of the apparatus about the spin axis X.

A rotation about the output axis Y has for its effect, in accordance with the fundamental law of mechanics, to tend to give the end of the kinetic moment of rotor 1 a speed equipollent to the moment of the forces that are applied, which means that the axis of said rotor is urged toward the output axis Y. But this movement is not free and as a matter of fact it is made impossible by the construction of the apparatus since the axis of the rotor is always at right angles to the output axis Y. The above mentioned effect therefore produces an action exerted on the bearings of gimbal 3 and the reaction produces a torque the moment of which is perpendicular both to the spin axis X and to the output axis Y. The effect of this torque is to impart a precessional motion to rotor 1 about the output axis Y, its rotation being exactly equal, as it can be demonstrated, to that imposed on the apparatus about the output axis Y. Thus, in the case of a rotation about the output axis Y, the system acts as if there was no gyroscopic effect or, to be more accurate, as if rotor 1 was not rotating.

Finally, a rotation about the input axis Z has for its effect, in accordance with the fundamental laws of mechanics, to give the end of the kinetic moment of rotor 1 a speed equipollent to the moment of the forces that are applied, which means that the rotor is given a precessional movement about the output axis.

Gimbal 3, which is rotatable about axis Y, is subjected to the action of two torques, to wit: the gyroscopic torque due to the rotation of the apparatus merely about the input axis Z, and the torque transmitted from the outside by the torque motor 6.

The angular movement of gimbal 3 is opposed by the static inertia of the journalled unit constituted by said gimbal and rotor 1, and furthermore said angular movement is braked, proportionally to its speed of rotation, by the damping device.

The angular displacement of gimbal 3 is the integral of the torques that are applied and it is measured by means of detector 5a, 5b.

The operation of the gyro-compass shown by Fig. 2, which makes use of such single-degree-of-freedom gyroscopes will now be described.

Figure 2:
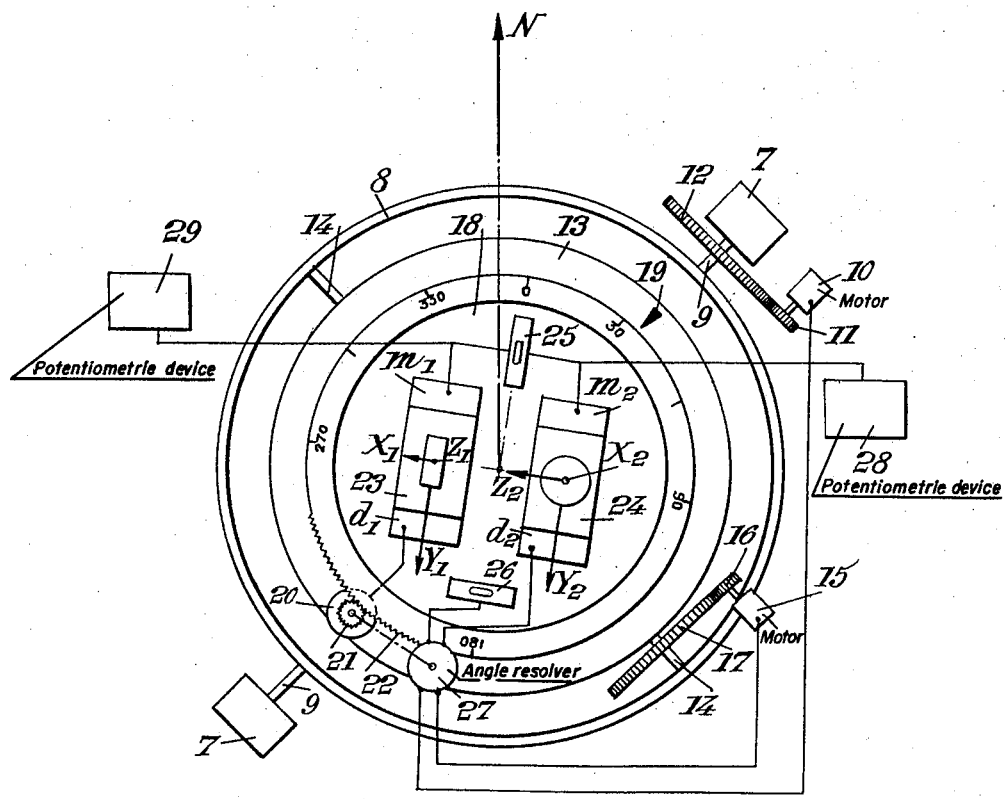
Fig. 2 is a diagrammatical plan view of a gyro-compass made according to the invention.

The apparatus of Fig. 2 includes a base 7, an outer gimbal 8 journalled in said base through a spindle 9, the movement of gimbal 8 about the axis of said spindle being controlled by an electric motor 10 fixed to the base 7 of the apparatus and the shaft of which is coupled with said gimbal 8, for instance by gears 11 and 12.

In the outer gimbal 8 there is journalled an inner gimbal 13 pivoted thereto through a spindle 14 which is preferably at right angles to spindle 9. The movement of the inner gimbal 13 about the axis of this spindle 14 is controlled by an electric motor 15 fixed to the outer gimbal 8 and the shaft of which is coupled with the inner gimbal 13 through gears 16 and 17.

Said inner gimbal 13 carries a circular table 18 rotatable with respect to 13 about an axis perpendicular to the plane thereof and passing through its center.

Gimbal 13 carries a mark 19 located on a line at right angles to the axis of spindle 14. Furthermore table 18 is provided, along its periphery, with a graduation in degrees from 0 to 360°, this graduation constituting the "compass rose."

Circular table 18 can be rotated in the inner gimbal 13 by means of an electric motor 20, carried by said inner gimbal and acting on table 18 through a pinion 21 fixed on the motor shaft 20 and meshing with the toothed periphery 22 of table 18.

For the feed of the respective motors 10, 15 and 20, there is provided a corresponding number of distinct amplifiers (not shown) each of which receives a control voltage as it will be hereinafter explained.

Table 18 carries two single-degree-of-freedom gyroscopes 23 and 24 made as above explained.

Gyroscope 23 has its input axis Z1 perpendicular to the plane of table 18, its output axis Y1 parallel to this plane and extending in the direction of the zero-180° line of the compass rose and its spin axis X1 parallel to said plane and extending in the direction of the graduations 90–270° of the compass rose.

Gyroscope 24 has its input axis Z2 parallel to the plane of table 18 and extending in the direction of the graduations 90–270° of the compass rose, its output axis Y2 parallel to said plane and extending in the direction of the graduations 0–180° of the compass rose and its spin axis X2 perpendicular to the plane of table 18.

Table 18 further carries two detectors 25 and 26. Detector 25 measures the inclination of table 18 about an axis parallel to the direction of the graduations 90–270° of the compass rose. Detector 26 measures the inclination of table 18 about an axis parallel to the direction of the graduations 0–180° of the compass rose.

Detector 25, which may be called "meridian inclination detector," is made to control the torque motor $m1$ of the gyroscope 23 the detector $d1$ of which controls the amplifier of motor 20.

As for detector 26, which may be called "lateral inclination detector," it is made to control the feed of the primary winding of an angle resolver 27 the rotor of which makes with its stator an angle equal to the angle read on the compass rose opposite the mark 19 carried by the inner gimbal 13. The second primary winding of this angle resolver is fed with a signal supplied by the detector $d2$ of gyroscope 24.

The angle resolver 27 serves to transform the signals received from the lateral inclination detector 26 and from the detector $d2$ of gyroscope 24 according to a trigonometric law which takes into account the angle read on the compass rose. The voltages supplied by the secondary windings of the angle resolver 27 serve to control, respectively, the amplifier of motor 10 and the amplifier of motor 15, the connections being arranged in such manner that the lateral inclination detector 26 causes motors 10 and 15 to supply rotations the combination of which gives table 18 a movement about an axis parallel to the direction of the graduations 0–180° of the compass rose, whereas the detector $d2$ of gyroscope 24 causes motors 10 and 15 to supply displacements the combination of which gives table 18 a movement about an axis parallel to the direction of the graduations 90–270° of the compass rose.

Advantageously but not necessarily, there may be added an auxiliary device which causes the torque motor $m1$ of gyroscope 23 to supply a supplementary torque the function and value of which are indicated by the following explanation, said auxiliary device being for instance constituted by a potentiometer adjustable in accordance with the latitude and feeding a voltage to the winding of said torque motor.

As above indicated, the lateral inclination detector 26 controls the inclination of table 18 about an axis parallel to the direction of the graduations 0–180° of the compass rose. In the following explanation, it will be supposed that this control is correctly performed, that is to say that the inclination of table 18 about an axis parallel to the direction 0–180° is zero and that the state of equilibrium in this position is not perturbed. This is tantamount to saying that the line of the graduations 90–270° of the compass rose remains parallel to a horizontal plane and that the only movements of the system that are considered are those about an axis parallel to the direction 90–270° and about a vertical axis.

It will first be supposed that table 18 is horizontal and that the zero of the compass rose is exactly on the arrow N indicating the North.

The horizontal component of the earth rotation is parallel to the output axes of the two gyroscopes 23 and 24. It is therefore without effect on said gyroscopes. The meridian inclination detector 25 causes the torque motor $m1$ of gyroscope 23 to give a zero torque. As for the vertical component of the earth rotation, it is parallel to the spin axis of gyroscope 24 and therefore has no effect thereon. On the other hand, this component is parallel to the input axis $Z1$ of gyroscope 23. There is therefore produced, in this last mentioned gyroscope, a gyroscopic torque proportional to the sinus of the latitude. But the auxiliary device causes the torque motor $m1$ of gyroscope 23 to produce a compensating torque which is exactly opposed to said gyrocopic torque so that, finally, gyroscope 23 is not subjected to any action.

Thus, when table 18 is horizontal and the zero mark of the compass rose is directed toward the North, one or the other of the gyroscopes 23 and 24 is acted upon and they remain in the position for which the detectors $d1$ and $d2$ produce no movement of the motors 20, 10 and 15: the system is in a state of equilibrium.

Calculation shows that, even if there were no compensating torque produced by the torque motor $m1$ of gyroscope 23 as a consequence of the action of the auxiliary device, the position of equilibrium of the system would be slightly offset with respect to the horizontal North, which would be still quite acceptable for practical purposes.

It will now be supposed that table 18, still horizontal, is deviated by some degrees, for instance toward the East. The action of the horizontal component of the earth rotation is then applied to gyroscope 24, whereas the actions of the vertical component and of the meridian inclination detector 25 remain zero. This is due to the fact that the horizontal component of the earth rotation is itself decomposed into a rotation parallel to the output axes $Y1$ and $Y2$ of the two gyroscopes (therefore without having any effect thereon) and a rotation parallel to the graduation line 90–270° of the compass rose, that is to say parallel to the spin axis $X1$ of gyroscope 23, therefore without effect on said last mentioned gyroscope, and parallel to the input axis $Z2$ of gyroscope 24, then exerting an action on said last mentioned gyroscope. Finally, this last action is the only one that takes place in the conditions above considered. The consequences of this action are as follows: the spin axis $X2$ of gyroscope 24 is urged toward the West; the detector $d2$ of this gyroscope controls the actions of motors 10 and 15 in such manner that table 18 is rotated so as to compel the zero graduation of the compass rose to rise. As a matter of fact, this rotation, which takes place about an axis parallel to the input axis $Z2$ of gyroscope 24, urges its spin axis $X2$ toward the East, the action of detector $d2$ being such that this urge toward the East exactly compensates for the urge toward the West due to the horizontal component of the earth rotation.

Thus, due to the movements of motors 10 and 15, the zero graduation of the compass rose rises above the horizon.

From this time on, the meridian inclination detector which measures the rise of the zero graduation above the horizon causes the torque motor $m1$ of the gyroscope 23 to exert a torque proportional to the inclination and which urges the spin axis $X1$ of said gyroscope in the downward direction. The detector $d1$ of gyroscope 23 then controls motor 20 in such manner that table 18 is rotated toward the left about the vertical axis, this rotation gradually returning the zero graduation of the compass rose in the North direction. As a matter of fact, this rotation about an axis parallel to the input axis $Z1$ of gyroscope 23, urges its spin axis $X1$ upwardly, the effect of detector $d1$ being such that this upward action exactly compensates for the downward action given to the torque applied by the meridian inclination detector 25.

Thus the zero graduation, which was initially in the horizontal plane and turned slightly toward the East, is made to rise above the horizon and at the same time to move toward the meridian.

When it reaches the meridian, the action of the horizontal component of the earth rotation on gyroscope 24 becomes zero, but table 18 is then inclined and the meridian inclination detector 25 maintains a torque of the same direction on gyroscope 23, so that the azimuthal rotation goes on. The zero graduation passes beyond the meridian, the action of the horizontal component of the earth rotation is again applied on gyroscope 24, but in a direction opposed to that which it had when the zero graduation was on the East side. The detector $d2$ of gyroscope 24 then controls motors 10 and 15 so that table 18 is given a rotation movement about the graduation line 90–270° of the compass rose, thus causing the zero graduation to draw back toward the horizon.

The meridian inclination detector 25, in response to this movement, causes, through gyroscope 23, a slowing down of the azimuthal movement toward the West, which finally comes to a stop when table 18 has again become horizontal. At this time, table 18 being horizontal and the zero graduation being deviated toward the West, the system is in a position identical to its starting position but with a deviation in the opposed direction with respect to the North. The operation then goes on as follows: when the zero graduation is on the East side of the meridian, it rises; when it is on the West side of the meridian, it is lowered; when it is above the horizon, it moves toward the West; when it is below the horizon, it moves toward the East.

Figure 3:
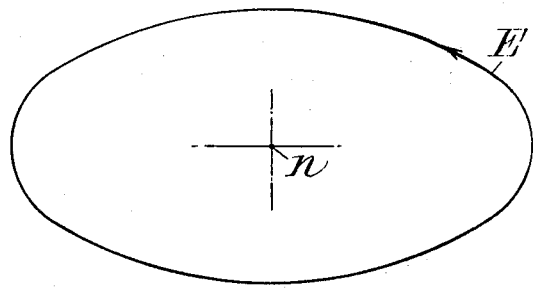
Figs. 3 and 4 are explanatory views concerning the operation of such a gyro-compass.

The trace, on a vertical plane perpendicular to the North direction, of the line passing through the center of the system and through the zero graduation of the compass rose describes an ellipse E having its center at the point of intersection with this plane of the horizontal North line, this trace being described in the anti-clockwise direction. Such an ellipse is shown on Fig. 3.

The movement of the system therefore corresponds to the composition of two conjugate harmonic movements, one about the East-West axis of the compass rose and the other about the vertical axis, these movements having the same period.

By a suitable choice of the parameters of the system and in particular of the values to be given to the kinetic moment of gyroscope 23 and to the torque delivered by torque motor $m1$ as a function of the meridian inclination, it is possible to give the period of the system any value, and in particular the characteristic value of 84.4 minutes, which has special advantages when the system is subjected to the effect of horizontal accelerations.

The system above described has a position of equilibrium which is the horizontal North and the movement of this system about this position of equilibrium is periodical. In order to cause the system to return to its position of equilibrium when it has been moved away therefrom, it is necessary to provide means for damping the oscillations.

Such a damping device may be made in any suitable manner and in particular as follows, the embodiment which will be described having the advantage that it requires no elements other than those already included in this system.

According to this embodiment, a winding of the torque motor $m2$ of gyroscope 24 is controlled by the meridan inclination detector 25, so that when the inclination of the table brings the zero graduation of the compass rose above the horizon, said torque motor $m2$ urges its spin axis $X2$ toward the East. It follows that the action of the detector $d2$ of gyroscope 24 causes a movement of motors 10 and 15 tending in all cases to reduce the inclination of table 18 about the line of the graduations 90–270° of the compass rose.

Account is to be taken of the following factors of correction: when the zero graduation is on the East side of the meridian, it rises more slowly when it is already above the horizon than when it is below the horizon; when the zero graduation is on the West side of the meridian, it moves down more quickly when it is above the horizon than when it is below it.

Figure 4:
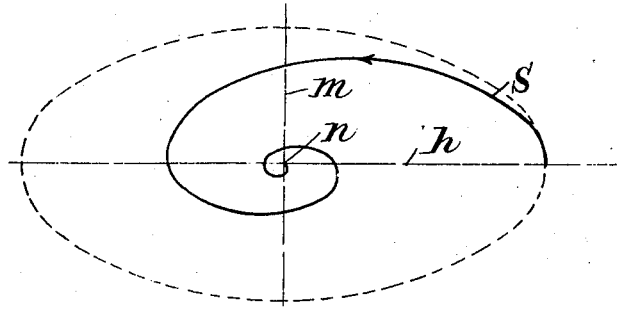

The trace of the zero graduation on a vertical plane perpendicular to the North direction, which in the absence of damping means is an ellipse, becomes in this case a spiral S tending toward the trace $n$ of the horizontal North and cutting at right angles the trace $h$ of the horizon and obliquely the trace $m$ of the meridian. Such a spiral S is shown on Fig. 4.

By suitable choice of the parameters of the system, and in particular of the values to be given to the kinetic movement of gyroscope 24 and to the torque delivered by its torque motor $m2$ as a function of the meridian inclination, it is possible to give the movement of the system a damping ratio of any value. It is also easy to eliminate this damping, when this seems preferable, by merely cutting the connection between the meridian inclination detector 25 and the torque motor $m2$ of gyroscope 24.

It should be noted that the lateral inclination detector 26 must be but little damped, this in order to keep the system on the apparent vertical about the graduation line 0–180° of the compass rose, in particular when the system is subjected to periodical accelerations such as those produced by the rolling of a ship. The damping time constant of the lateral inclination detector 26 will therefore be deliberately chosen small with respect to the mean pitching period.

On the contrary, the meridian inclination detector 25 must be strongly damped, in order to avoid the combination of the effects of the periodical accelerations such as those produced by rolling on the two detectors which would result, if no precautions were taken, in a big error in the indication of the North direction. The damping time constant of the meridian inclination detector 25 must therefore be chosen high with respect to the mean pitching period.

When the apparatus is used on board a vehicle moving on the surface of the earth, the rotation of the vehicle about the earth center is combined with the earth rotation, which has for its effect to offset the position of equilibrium of the system with respect to the North direction by a certain angle.

This error may be compensated by having recourse to an auxiliary device such as a potentiometric device 28 the function of which is to correct this error in accordance with the heading and the speed of the vehicle. This device creates, by means of the torque motor $m2$ of gyroscope 24, a compensation torque proportional to the error. The position of equilibrium of the system is then offset in azimuth until the action of the horizontal component of the rotation of the vehicle about the earth center is exactly opposed to the compensation torque. This azimuthal offsetting eliminates the error.

Finally the mechanisms operated by motors 20, 10 and 15 may be combined with suitable angle transmitters permitting of transmitting to a distance the following elements: heading of the ship, absolute pitching, relative rolling, these two last mentioned elements making it possible to determine the true vertical in the meridian plane and only the apparent vertical, at the place where the apparatus is located, in the East-West vertical plane.

The apparatus above described is a gyro-compass but it may also, by means of slight modifications in the connections between its elements, be used as a directional gyroscope for keeping a predetermined direction.

The modifications to be brought to the apparatus in order to transform it into a directional gyroscope are as follows:

The connection between the meridian inclination detector 25 and the torque motor $m1$ of gyroscope 23 is cut off. The auxiliary device 28 is dispensed with. The meridian inclination detector 25 controls the torque motor $m2$ of gyroscope 24 the detector $d2$ of which *still* controls one primary winding of the angle resolver 27 the rotor of which is disposed as above explained and the other primary winding of which is still controlled by the lateral inclination detector 26.

With this arrangement, the apparatus is stabilized about an axis parallel to the direction of the graduations 90–270° of the compass rose and compelled to have a position of equilibrium such that the 0–180° line of the compass rose is horizontal. As a matter of fact, any rotation about an axis parallel to the direction 90–270° of the compass rose urges gyroscope 24 about its output axis $Y2$, but the action of detector $d2$ causes gyroscope 24 to rotate in an exactly opposed direction so that these two rotations compensate each other. On the other hand, in the absence of a perturbing rotation, the meridian inclination detector 25 produces in the torque motor $m2$ of gyroscope 24 a torque if the line 0–180° of the compass rose is not horizontal and this torque has for its effect, still through the action exerted by detector $d2$, to return table 18 to the horizontal position about the axis 90–270° of the compass rose. Theoretically it would be necessary to take into consideration another action, that of the horizontal component of the earth rotation on gyroscope 24 when the output axis $Y2$ of said gyroscope is not directed toward the North. For practical purposes, this action is negligible as compared with that of the meridian inclination detector 25 provided that the parameters are chosen in such manner that the value given to the torque delivered by torque motor $m2$ as a function of the meridian inclination is sufficiently high.

The torque motor $m1$ of gyroscope 23 is controlled exclusively (with the exception of one case which will be hereinafter examined) by the above described auxiliary device, which causes it to supply a torque proportional to the sinus of the latitude in order to compensate exactly for the action of the vertical component of the earth rotation on said gyroscope 23.

In these conditions, as long as no rotation is imparted to the apparatus about the vertical axis, or to be more accurate, about the input axis $Z1$ of gyroscope 23 (perpendicular to its output axis $Y1$ which is kept horizontal by the above described devices and is also perpendicular to its spin axis $X1$ which is not necessarily exactly horizontal), gyroscope 23 is not urged in any way. But if a disturbing rotation appears about the vertical axis, the action of detector $d1$ causes motor 20 to act so as to produce an exactly opposed rotation. Thus, the azimuthal direction of the zero graduation of the compass rose of table 18 is kept fixed.

In view of the fact that account is taken of the effect of the vertical component of the earth rotation, the direction maintained by the apparatus is fixed with respect to the earth, so that a vehicle which would keep its heading with respect to this fixed direction would describe on the earth an arc of a great circle, that is to say an orthodromic line. The application of this principle by means of the apparatus which has just been described is often advantageous for navigation in polar areas.

But it is known that the heading of a vehicle, that is to say the dihedral angle of the meridian and of the vertical plane containing the axis of the vehicle, varies constantly when the vehicle moves along an orthodromic curve. It is therefore preferable, in some cases, to navigate along a loxodromic curve, that is to say with a constant heading.

A complementary feature of the present invention makes it possible to comply with this condition. According to this feature, use is made of an auxiliary device 29, for instance including a potentiometer, so as to cause the torque motor $m1$ of gyroscope 23 to supply a complementary torque proportional to the East-West speed of the vehicle and to the tangent of the latitude so that, through the action of detector $d1$, motor 20 rotates table 18 in the suitable manner.

Finally the apparatus may also include a device, for instance a potentiometric device, for causing the torque motor $m1$ of gyroscope 23 to deliver any torque, in order to produce a movement of motor 20 which permits a resetting of the compass rose carried by table 18.

The apparatus which is being described has the following advantages: the delay of operation of the apparatus is very short and, for practical purposes, it depends only upon the delay of operation of the gyroscopes; before it is starting in operation, the apparatus may be placed in a direction as close as possible to the North; from the beginning of the operation, the period of the movement may be adjusted to a short value and the ratio of damping adjusted to the optimum value for a quick stabilizing of the position of equilibrium, the delay of utilization of the apparatus being thus possibly reduced to some minutes; as soon as the apparatus is used, the period of the movement may be adjusted to the optimum value, that is to say 84 minutes, and the ratio of damping to the most suitable value for utilization; during utilization, the damping device may be brought out of action when so desired and in particular in order to avoid the errors inherent in damping in case of horizontal accelerations; during utilization, and in particular on board a vehicle that is in movement, the operation of the device may be transformed so as to cause it, instead of indicating the North direction, to keep a fixed direction; the apparatus involves no delicate adjustment or balancing so that, if necessary, one of its elements, for instance one of its gyroscopes, may be replaced without having to modify the adjustment of the other elements.

Fig. 5 illustrates an apparatus made according to the above stated principle and intended to determine a horizontal plane or the vertical at some place, so as to stabilize in a horizontal position a table having two degrees of freedom.

The apparatus includes a base 107 on which is journalled an outer gimbal 108 rotatable about the axis of a spindle 109. The movement of said gimbal 108 about its axis is given by a motor 110 carried by the base and the shaft of which drives gimbal 108 through gears 111, 112.

This outer gimbal 108 carries an inner gimbal 113 pivoted therein about the axis of a spindle 114. The movement of the inner gimbal 113 about said axis is given by a motor 115 carried by the outer gimbal 108 and the shaft of which drives the inner gimbal 113 through gears 116, 117.

In this inner gimbal 113 is mounted a circular table 118 rotatable in said gimbal 113 about an axis perpendicular to the plane of said gimbal 113 and passing through the center thereof. The movement of table 118 about its axis is given by a motor 120 carried by the inner gimbal 113 and the shaft of which acts upon table 118 through gears 121, 122. Motor 120 is intended to keep table 118 constantly in a position determined with respect to geographical North-South and East-West axes, a North mark 119 carried by table 118 being kept in the direction of the North. To obtain this result, motor 120 is controlled for instance by a compass or a heading indicator.

Motor 110 and motor 120 are each fed through an amplifier (not shown on the drawing) receiving a control voltage as it will be hereinafter explained.

Table 118 carries two single-degree-of-freedom gyroscopes 123 and 124 the axes of which are disposed as follows.

Gyroscope 123 has its input axis Z3 parallel to the plane of table 118 and extending in the East-West direction, its output axis Y3 parallel to the plane of the table and extending in the North-South direction, and its spin axis X3 at right angles to the plane of table 118.

The position of gyroscope 124 is deduced from that of gyroscope 123 by a rotation of 90 degrees about the axis perpendicular to table 118, its characteristic axes being respectively designated by X4, Y4 and Z4.

Table 118 further carries two inclination detectors 125 and 126. The first of these detectors measures the inclination of table 118 about an axis parallel to the East-West direction of said table and the other detector measures the inclination of the table about an axis parallel to the North-South direction thereof.

Detector 125, called "meridian inclination detector," controls the torque motor $m4$ of gyroscope 124, whereas detector 126, called "lateral inclination detector," contorls the torque motor $m3$ of gyroscope 123.

The detectors $d3$ and $d4$ of gyroscopes 123 and 124 each control one primary winding of an angle resolver 127 the rotor of which makes with its stator an angle equal to the heading of the ship.

This angle resolver 127 is intended to transform the signals received from the gyroscope detectors according to a trigonometric law taking the heading angle into account. The voltages supplied by the secondary windings of resolver 127 control, for one of them the amplifier of motor 110, for the other the amplifier of motor 115, the connections being arranged in such manner that the detector $d3$ of gyroscope 123 causes both of said motors to have movements the combination of which imparts to table 118 a movement about an axis parallel to the East-West direction, whereas the detector $d4$ of gyroscope 124 causes the two motors to supply movements the combination of which causes table 118 to move about an axis parallel to the North-South direction.

Gyroscope 123, the input axis Z3 of which is parallel to the East-West direction, that is to say perpendicular to the direction of the line passing through the poles of the earth, is uninfluenced by the earth rotation. This is not the case of gyroscope 124 the input axis Z4 of which is parallel to the direction D of the horizontal component of the earth rotation. In order to compensate for the effect of the earth rotation upon gyroscope 124, there is provided a correcting device 129, for instance a potentiometer adjustable as a function of the latitude and which feeds an auxiliary winding of the torque motor $m4$ of gyroscope 124 so that the torque thus created compensates for the gyroscopic torque due to the earth rotation.

In order to explain the operation of the system, it will be supposed that table 118 is constantly directed in the correct azimuth direction, that is to say that its North mark 119 is always turned toward the North.

Now if it is supposed that table 118 is inclined about the North-South axis so that the East portion of the table is lower than the West portion thereof, the lateral inclination detector 126 creates a torque proportional to the inclination in the torque motor $m3$ of gyroscope 123, thus urging its axis toward the East. The detector $d3$ of gyroscope 123 controls the movements of motors 110 and 115 in such manner that table 118 is caused to rotate about the East-West axis, so as to lower the North mark 119 carried by table 118. This is due to the fact that this rotation about an axis parallel to the input axis Z3 of gyroscope 123 urges its spin axis X3 toward the West, the action of detector $d3$ being such that this urge toward the West exactly compensates for the urge toward the East due to the lateral inclination.

Due to the fact that table 118 is inclined about the East-West axis, the meridian inclination detector 125, in response to the lowering of the North mark 119 causes the torque motor $m4$ of gyroscope 124 to deliver a torque proportional to the inclination, which torque urges the spin axis $X4$ of gyroscope 124 toward the North.

The detector $d4$ of this last mentioned gyroscope then controls motors 110 and 115 in such manner that table 118 is caused to rotate about the North-South axis, tending to lift the East side of table 118. As a matter of fact, this rotation about an axis parallel to the input axis $Z4$ of gyroscope 124 urges its spin axis $X4$ toward the South, the action of detector $d4$ being such that this urge toward the South exactly compensates for the urge toward the North due to the meridian inclination.

It will thus be seen that the East side of table 118, which initially has been lowered, is moved upwardly at the same time as the North side is lowered. When the East-West axis of table 118 is horizontal, the North portion is lowered but the movement of inclination about the East-West axis becomes zero, whereas the movement about the North-South axis goes on.

The movement keeps going on in the same manner which may be summed up as follows: when the East side of table 118 is lowered, the North side is lowered; when the North side of the table is lowered, the East side is moved upwardly; when the West side of the table is lowered, the North side is moved upwardly; when the South side of the table is lowered, the East side is lowered.

The trace, on a horizontal plane, of the perpendicular to the center of table 118 would describe an ellipse about the projection of the zenith, this ellipse becoming a circle if the two characteristics of gyroscopes 123 and 124 are identical, same as those of detectors 125 and 126.

The movement of the system is therefore constituted by the composition of two conjugate harmonic movements, one about the East-West axis, the other about the North-South axis, these two movements having the same period.

By suitably choosing the parameters of the system, and in particular the values to be given to the kinetic moments of gyroscopes 123 and 124, and also to the torques supplied by the torque motors $m3$ and $m4$ as a function of the inclinations, it is possible to give the period of the system any suitable value, and in particular a value of 84.4 minutes, which represents special advantages when the system is subjected to horizontal accelerations.

The apparatus above described has, when the vehicle which carries it is stationary, a position of equilibrium which is the horizontal plane. In order to cause the system, when moved away from its position of equilibrium, to return to this position, it is necessary to provide it with means for damping the oscillations.

Such damping may be obtained in different ways and in particular by providing the torque motor $m3$ of gyroscope 123 with an auxiliary winding controlled by the meridian inclination detector 125 so that, when the North side of the table is lowered, the torque motor $m3$ of gyroscope 123 urges its spin axis $X3$ toward the West, which has for its result to produce, under the action of the detector $d3$ of this gyroscope, an additional movement of motors 110 and 115, both tending to reduce the inclination about the East-West axis.

In this case, the trace of the straight line perpendicular to the center of table 118 describes on a horizontal plane, no longer an ellipse but a spiral tending toward the projection of the zenith.

By a suitable choice of the parameters of the system, it is possible to give the movement a damping ratio of any value whatever. It is also possible to cut off this damping action, when this is preferable, merely by cutting off the connection between the meridian inclination detector 125 and the torque motor $m3$ of gyroscope 123.

When the body or vehicle which carries the apparatus is moving on the surface of the earth, the position of equilibrium of the system is no longer in the horizontal plane in view of the effect, on gyroscopes 123 and 124, of the rotation of said vehicle about the center of the earth. But the angle made with the horizontal plane by the new position of equilibrium of the system depends only upon the speed and the heading of the vehicle. This angle may be easily calculated and it may be taken into account for determining the horizontal plane from the position of the table. If the system is given a period of 84.4 minutes, it may be demonstrated that a horizontal acceleration does not disturb its instantaneous equilibrium position, account being taken of the fact that this position of equilibrium varies according to a known law as a function of the speed of the vehicle.

It has been stated above that table 118 is constantly given the correct azimuthal direction by means of a motor which is controlled for instance by a heading indicator. But this motor 120 might be controlled in a different manner, for instance by a third single-degree-of-freedom gyroscope carried by table 118 and having its input axis at right angles to the plane of said table. In this case, this gyroscope would act as a directional gyroscope to keep the table in the suitable direction previously obtained through another means.

This motor 120 could also be controlled by a device including two gyroscopes, as described with reference to Fig. 2 and behaving as a gyro-compass. In this case, the two systems might be made independent of each other, about the East-West axis.

What I claim is:

1. A gyroscopic apparatus comprising two gyroscopes, a first one and a second one, means for mounting each of said gyroscopes with a single-degree-of-freedom about an output axis perpendicular to its spin axis, whereby an output torque about the output axis thereof is generated by an instantaneous angular velocity of rotation about an input axis perpendicular to the spin and output axes thereof, damping means belonging to each of said gyroscopes to resist output deflections by a torque substantially proportional to the rate of output deflection, a controlled member on which the two gyroscopes are mounted so that the direction of their respective input axes are transverse to each other, means for detecting deviations of the controlled member about an axis parallel to the input axis of the first gyroscope, means for detecting deviations of the controlled member about an axis parallel to the input axis of the second gyroscope, means for rotating said controlled member about at least two axes different from each other, means operative by the first mentioned detecting means for generating torques tending to deflect the second gyroscope about its output axis, means operative by the second mentioned detecting means for generating torques tending to deflect the first gyroscope about its output axis, means operative by deflections of the first gyroscope about its output axis to activate the rotating means to rotate the controlled member about an axis parallel to the input axis of the first gyroscope, without any rotational component about the input axis of the second gyroscope, means operative by deflections of the second gyroscope about its output axis to activate the rotating means to rotate the controlled member about an axis parallel to the input axis of the second gyroscope, without any rotational component about the input axis of the first gyroscope, whereby the controlled member is caused to behave as an oscillatory system having a stable position of equilibrium.

2. A gyroscopic apparatus according to claim 1 in which one of said detecting means is constituted by one of said gyroscopes which thus performs a double function.

3. A gyroscopic apparatus according to claim 1 in which one of said detecting means is constituted by one of said gyroscopes, this last mentioned gyroscope having its input axis parallel to the plane of said controlled member and its spin axis at right angles to said plane, the other gyroscope having its input axis at right angles to said plane and its spin axis parallel thereto, the output axes of said two gyroscopes extending in parallel directions, the plane of said controlled member being horizontal in position of equilibrium and the other of said detecting means being oscillable about an axis parallel to the input axis of the first mentioned gyroscope.

4. A gyroscopic apparatus according to claim 1 in which said gyroscopes have their input axes at right angles to each other and both parallel to the plane of said controlled member, the output axes of said gyroscopes being also at right angles to each other and both parallel to said plane, the spin axes of said gyroscopes being both at right angles to said plane.

5. A gyroscopic apparatus according to claim 1 further including means for damping the oscillations of said controlled member.

References Cited in the file of this patent
UNITED STATES PATENTS

| | | |
|---|---|---|
| 1,309,409 | Henderson | July 8, 1919 |
| 1,335,055 | Hedenstrom | Mar. 30, 1920 |
| 2,771,779 | Schaffer et al. | Nov. 27, 1956 |